Oct. 11, 1955    M. E. KARP ET AL    2,720,426
VEHICLE CONTROL SYSTEM
Filed April 12, 1951    4 Sheets-Sheet 1

INVENTORS
Martin E. Karp
George A. Grubis.
BY Martin J. Finnegan
ATTORNEY

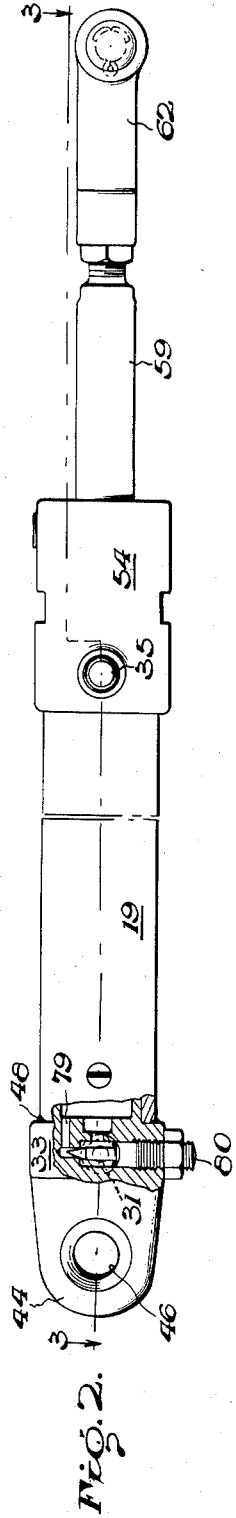
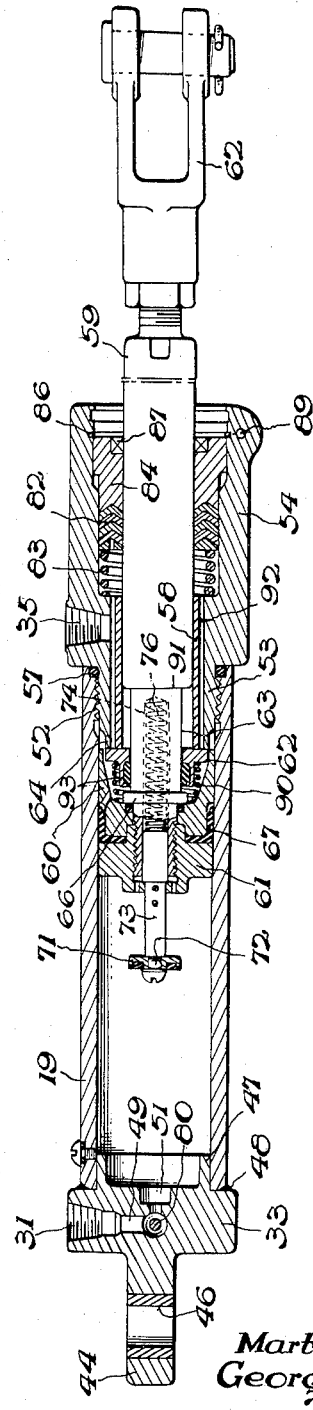

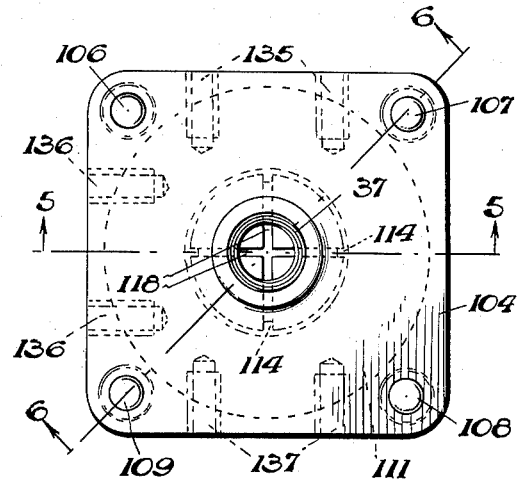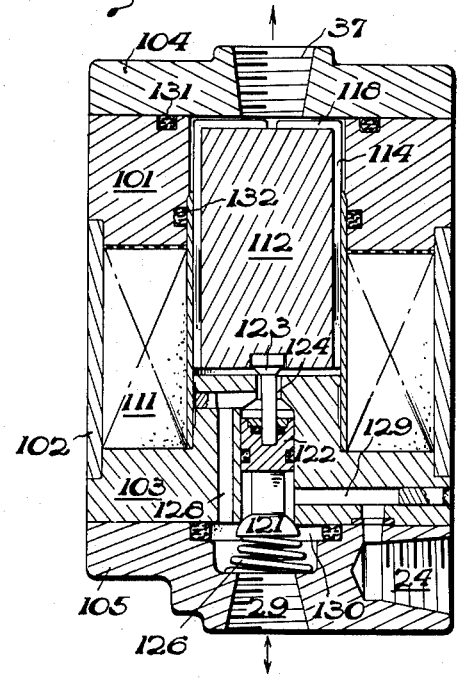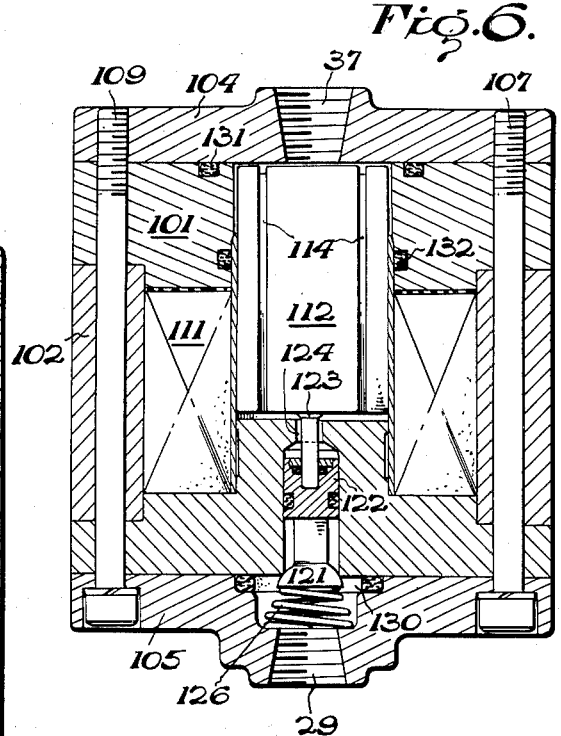

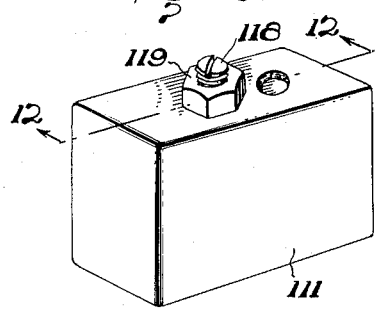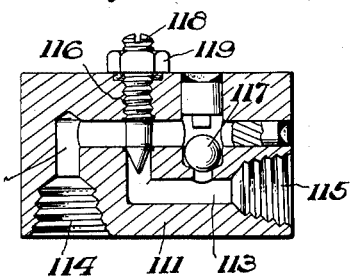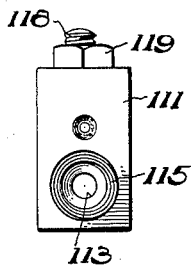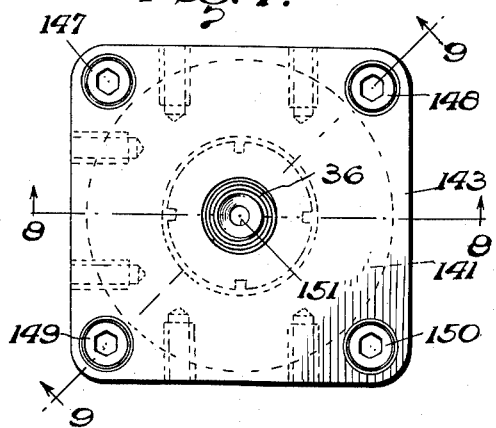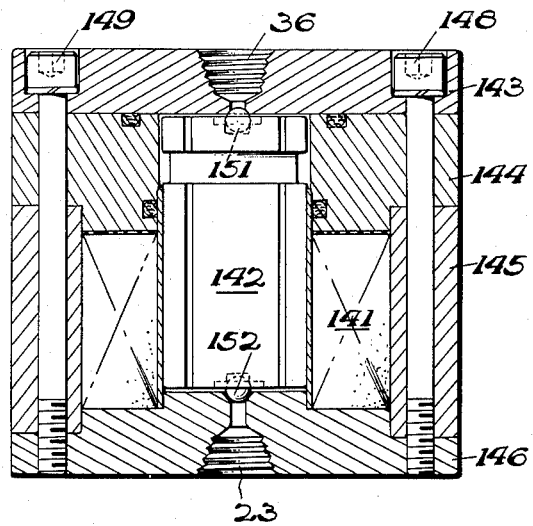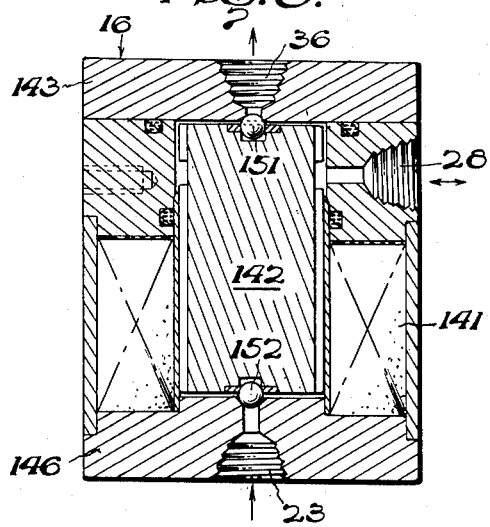

United States Patent Office 2,720,426
Patented Oct. 11, 1955

2,720,426

VEHICLE CONTROL SYSTEM

Martin E. Karp, Newton Center, and George A. Grubis, South Boston, Mass., assignors to National Pneumatic Co., Inc., Boston, Mass., a corporation of Delaware Application April 12, 1951, Serial No. 220,634

3 Claims. (Cl. 303—6.1)

This invention relates to vehicle control systems, and particularly to a system including interlocking remote control of both the doors and the wheel brakes of a motor-driven vehicle, operable over either a tracked or trackless road-way.

An object of the invention is to provide a system including a plurality of door actuating motors and control units of novel construction and novel inter-relationship for the purpose of providing remote control of the successive strokes of the power applying element of each motor.

A second object of the invention is to provide a combined door and brake operating system in which all operating units for both brakes and doors are energized from a single source of fluid pressure by means of a network of hydraulic conduits through which the same fluid medium circulates in repeated cycles, without appreciable loss of fluid over prolonged periods of use.

A third object is to provide, in such a system of hydraulic conduits, electrical interlocking means for inter-relating the electrical circuits of the vehicle with the hydraulic circuits, so that the latter are controlled by the former.

A fourth object of the invention is to provide interlocking fluid pressure means for maintaining the door opening and brake applying means so inter-related that the former cannot operate in advance of operation of the latter, thus assuring that the vehicle brakes will be in applied position before any door of the vehicle can be opened, and will remain in applied position until all opened doors have re-closed.

In this connection novel features of the invention include the following:

1. A four-unit system comprising door and brake units cooperating with two valve units interposed between the former and the common source of fluid under pressure; each of said four units being novel in its construction and in the manner in which it affects the functioning of each of the other units.

2. A door operating motor comprising a single cylindrical element, a single piston element reciprocable therein, a pair of closure elements engageable with opposite ends, respectively, of said cylindrical element, and double acting means incorporated in the piston element, and engageable with the respective closure elements to achieve shock absorbing action in each direction of operation.

3. A pair of valve units, each incorporating an electric current-receiving winding, a magnetic shuttle element under the influence of said winding and extending thereinto, and fluid flow channels extending longitudinally in parallel relationship to the axis of said shuttle; said channels being formed by said shuttle and cooperating therewith to control fluid flow through three ports provided in each of said valve units.

4. A flow control mechanism incorporated in at least one of said valve units, and functioning to reduce the total amount of work that must be performed by the electro-magnetic means of said valve unit, in moving the magnetic shuttle element from one setting to the other.

Other objects and features of the invention will be suggested by reference to the accompanying drawings illustrating one embodiment of the invention, and the following description of the illustrated embodiment; this being merely one of many possible exemplifications, all of which are intended to be embraced herein, to the extent that they embody one or more of the disclosed inventive concepts.

In the drawings:

Fig. 2 is a longitudinal sectional view of the motor of Fig. 1;

Fig. 3 is a transverse sectional view of line 3—3 of Fig. 1;

Fig. 4 is a top plan view of one of the valve units;

Figure 1:
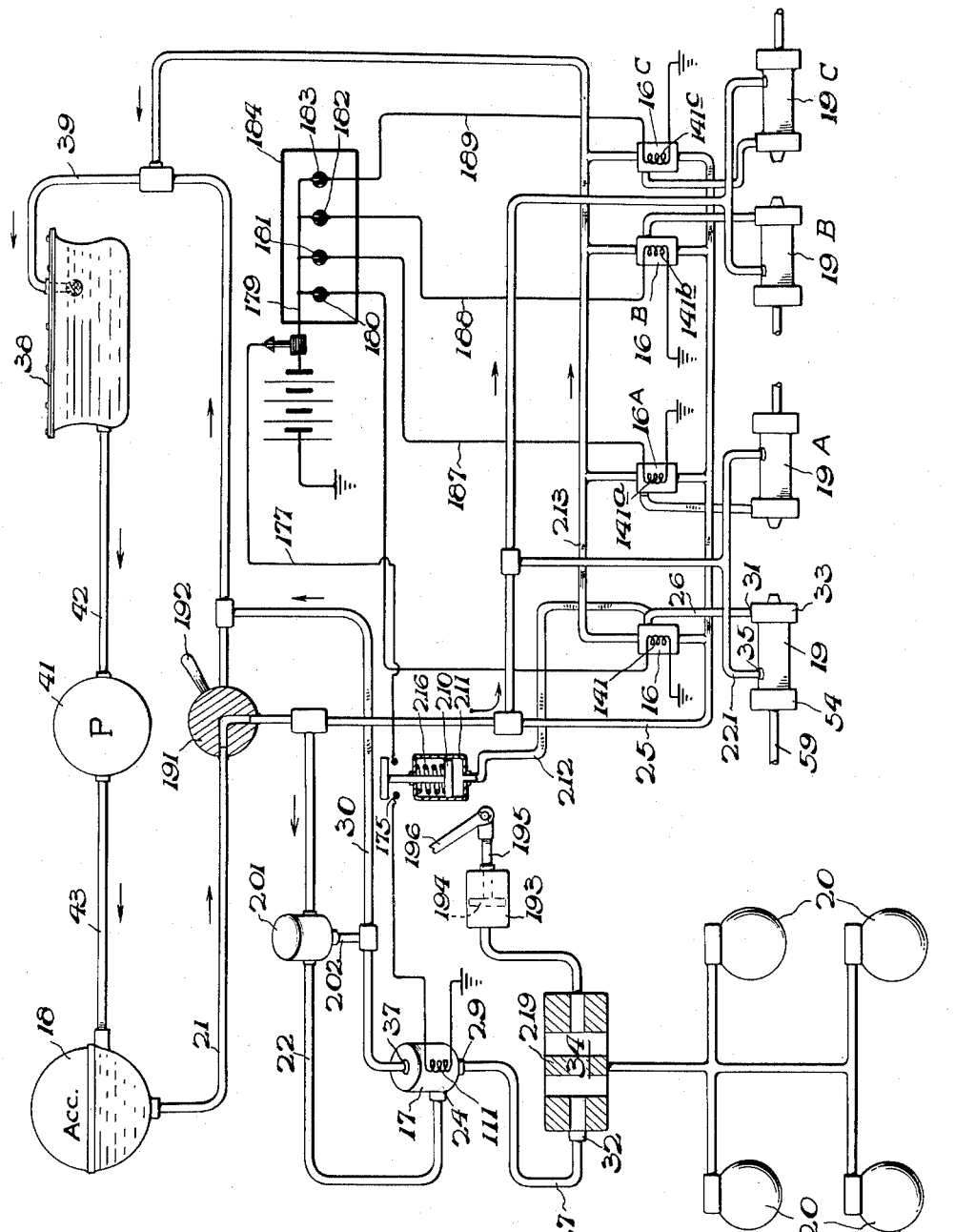
Fig. 1 is a diagram of electrical and hydraulic connections for operation of all doors and brakes of the vehicle.

Figs. 5 and 6 are sectional views on lines 5—5 and 6—6, respectively, of Fig. 5;

Fig. 7 is a top plan view of the other valve unit;

Figs. 8 and 9 are sectional views on lines 9—9 and 10—10 of Fig. 8;

Fig. 10 is a perspective view of an auxiliary flow regulating unit;

Fig. 11 is a sectional view along line 12—12 of Fig. 11; Fig. 12 is an end view of the unit shown in Fig. 12.

Referring first to Fig. 1, the two valve units are shown at 16 and 17 as interposed between the hydraulic pressure accumulator 18 and door and brake actuating motors 19, 20, respectively; there being fluid flow connections 21 and 22 from said accumulator to the inlet ports 23 and 24 respectively of said valve units, and additional fluid flow connections 26 and 27 leading from the working ports 28 and 29 respectively of the valve units and terminating in the motor supply ports 31 and 32, the former being disposed radially of the motor closure element 33 of door motor 19, and the ports 32 being a part, of a master shuttle valve 34 controlling operation of wheel brake cylinders 20. Door operating motor 19 has a fitting 35 integral with the front closure 54 as indicated in Fig. 3. The valve units 16 and 17 are provided with flow return ports 36 and 37, respectively, to direct fluid back to a reservoir 38, by way of the common return conduit 39. From the reservoir 38 fluid is pumped to the accumulator 18 by way of the pumping instrumentality indicated schematically at 41 and the associated conduits 42 and 43, with suitable interposition of check and relief valves, etc. as indicated are well known arts.

Referring now to Figs. 2 and 3 it will be noted that closure element 33 has a rearwardly extending bracket 44 centrally apertured to receive a bearing element 46 facilitating pivotal mounting of the motor upon a suitable pin or post type of support (not shown). The closure element 33 is also provided with an annular extension 47 adapted to fit within the adjacent end of the cylinder 19 and form a piloting connection therewith, after which the two pieces 19 and 33 are preferably integrated one with the other by use of a brazing compound as indicated at 48. Connecting passages 49, 51 and 79 are provided in the closure element 33 for the purpose of establishing communication between the conduit terminal port 31 and the interior of the cylinder 19. Screw 80 is a manual adjustment for the area of by-pass 79.

The opposite end of cylinder 19 is threaded as indicated at 52 for cooperation with corresponding threads provided on the shank portion 53 of the second cylinder closure element 54 adapted to be threaded into the cylinder 19 until the shoulder of the closure element engages the adjacent end of the cylinder; the sealing ring 57 being inserted at this point to insure against loss of pressure fluid. The shank portion 53 of the closure element 54 is fitted with a sleeve 58 serving as a bearing element for the surfaces of the rod 59 connecting the piston 61 with the yoke member 62 constituting part of the linkage by which the door (not shown) is moved from closed to open position and returned in response to movement of the piston 61 in one direction, and then the other, within its rectilinear path as defined by the cylinder 19.

The means for connecting the piston rod 59 to the piston 61 includes a shank portion 63 extending from the main body of the rod 59 and threaded for engagement with corresponding threads provided along the central bore of the piston 61. It will be noted that the piston consists of two complementary sections 60 and 61, the former being in direct engagement with the shoulder 66 of the piston rod and the latter being separated from the outer surface of the section 60 by the interposed sealing cup 67; the cup 67 having its skirt portion in sliding contact with the inner surface of the cylinder 19. The construction just described serves not only to establish fluid-tight connection between the piston and its piston rod.

Cushioning in the closing direction is accomplished by permitting a sliding element 62, which is held outward by spring 90 against shoulder 91 of the piston rod 59, to come in contact with the face of the shank 53 of the closure element 54. When such engagement occurs the exhaust of fluid which usually passed through grooves is directed through a metered orifice 64 hence providing a shock absorbing action. The rubber seal 93 prevents the escape of fluid along the shaft 63.

The means for cushioning the final stage of the motor's movement in the door opening direction includes a valve element 71 held in position upon the neck portion 72 of a cushioning rod 73 mounted for limited movement within and in relation to the counterbored portion 74 of the piston rod 59; there being a spring 76 of predetermined compressive force constantly urging the rod 73 to its outermost position as determined by the positioning shoulder. Valve 71 is of sufficient diameter to bridge the passage 51 and thereby close said passage as the motion of the piston 61 to the left causes the said valve 71 to be carried into engagement with the surface of the closure element 53 adjacent the passage 51. When such engagement occurs further motion of the rod 73 is prevented but the piston 61 is free to continue to the left to complete its normal stroke, the relative motion between the rods 59 and 73 being permitted by reason of the yieldability of the spring 76. During this final stage of motion to the left the progress of the piston is retarded to the desired predetermined degree as controlled by the adjusted position of screw 80 across the auxiliary exhaust passage 79.

Fluid tightness as between the closure element 54 and the piston rod 59 is assured by providing a shouldered element 84 engageable with a correspondingly shouldered portion on the inner surface of closure element 54. The said element 84 serves to retain the spacing material 82 which is resiliently compressed against said element 84 by the action of the coil spring 83 located at the inner end of the counterbored portion of the closure element. Snap ring 86 fits within a suitable circular groove in the element 54 to lock packing retainer 84 in position. An expansion type sealing element 87 is press fitted into the shouldered element 84. A radially disposed set screw 92 may be provided in piston 61 to lock the latter in properly adjusted relationship upon the extending shank of piston rod 59. A hole 89 may be provided in closure element 54 to drain minor leakage back to the sump 38.

As illustrated in Figs. 4, 5 and 6 the valve unit 17 is embodied in a sectional housing consisting of three (3) inter-fitting body sections 101, 102 and 103 and two (2) end plates 104 and 105 all of which are held in assembled relationship by four (4) through bolts whose heads 106, 107, 108 and 109 are received in sockets formed in the lower end plate 105, the end portions of the bolts being threaded for engagement with corresponding threads in the aligned openings extending through the upper end plate 104. A wound current conducting core 111 is adapted to fit between the valve body sections 101 and 103, the inner diameter of the coil corresponding to that of the body section 101, within which body section is also received the central core 112 of "soft magnetic" material, together with a non-magnetic metallic liner or sleeve 113 which in conjunction with the outer central body section 102 serves as a lateral retaining means for the coil 111. As previously indicated, the magnetic core 112 is of generally cylindrical shape and is provided with a series of channels 114 extending longitudinally thereof in angularly spaced relationship about the outer cylindrical surface; the said outer surface otherwise having sliding contact with the sleeve 113, and these channels 114 constituting longitudinally extending paths along which the hydraulic fluid of the operating system may flow and thus establish communication between the ports 29 and 37 of the valve during those periods when no current is flowing through the coil 111; the pressure of the fluid entering the port 29 operating, during such periods, to raise the magnetic core 112 away from contact with the upper surface of the valve body section 103 to the extent necessary to establish a fluid flow path between the bottom surface of the core 112 and the said upper surface of the body section 103, from which point the fluid passes upwardly along the several channels 114 and emerges from the valve by way of port 37. In this connection attention is directed to the horizontally extending channels 118, which channels 118 extend along the upper surface of the core 112 and thus constitute lateral continuations of the longitudinally extending channels 114.

The valve unit 17 also incorporates a novel pressure compensating mechanism in the form of a second shiftable valve core 121 whose lower conical portion is biased into engagement with the circular edge of the counterbored central portion of a cooperating valve element 122 fitting within the valve section 103. Section 103 is longitudinally ported to provide a by-pass 128 about valve 121; the valve core 121 having an upwardly extending stem 124 fitting within a counterbored depression in the bottom portion of the main core 112 and adapted to be depressed by said main core 112 in response to passage of electric current through the coil 111. The resulting downward motion of said core 112 causes the seating element 123 to move into flow interrupting contact with the upper surface of the valve section 103. This downward movement of the cores 112 and 121 in unison also operates to create a second fluid by-pass path about the core 121, against the opposition of the yielding spring 126 whereby there is established a new path of flow which inter-connects the ports 24 and 29, the said path including the laterally extending passage 129 which connects the port 24 with the lower chamber 130 leading to the outlet port 29.

In order to seal the several joints between the successive sections of the unit the sealing rings 131, 132, 133 and 134 are provided at the points indicated in Figs. 6 and 7. To facilitate a lateral mounting of the unit against a vertical support the body section 101 is provided with lateral extending tapped holes 135, 136 and 137 adapted to receive mounting screws, not shown; it being understood of course that other mounting provisions may be substituted in any manner that does not interfere with free access to the threaded openings 24, 29 and 37 to which the pipes 22, 27 and 30 of Fig. 1 are attached.

The valve unit 16 as illustrated in Figs. 1, 8 and 9 is provided with a current receiving coil 141 and a central magnetic core 142 corresponding generally to the coil and the core 111 and 112 respectively of the valve unit 17; the said coil and core being mounted in the assembled housing sections 143, 144, 145 and 146 corresponding generally to the housing sections 101 to 150 inclusive of the valve unit 17 and held in assembled relationship by through bolts 147 to 150 inclusive corresponding to the through bolts 106 to 109 inclusive of the valve unit 17; but in place of the auxiliary valve core 121 of the valve unit 17 there is substituted a pair of ball valves 151 and 152 fitting into aligned recesses formed in the upper and lower surfaces of the valve core 142 and also engageable at alternate times with their respective flow interrupting seats formed in the adjacent surfaces of the upper and lower valve body sections 143 and 146 respectively, which body sections also are provided with aligned vertical passages terminating in pipe receiving threaded counterbores 23 and 36 respectively constituting, with the threaded counterbored section 28, the three (3) flow-controlling ports of the valve 16. With no electric current passing through the coil 141 the pressure of the hydraulic fluid entering the port 23 operates to raise the ball valve 152 from its seat and simultaneously to cause the core 142 to rise which causes the ball valve 151 to engage firmly with the seat, these two actions operating to establish fluid connection between the ports 23 and 28 by way of the inter-connecting passages along the bottom and side surfaces of valve core 142. Pipes 25 and 26 (which attach to the ports 23 and 28 respectively) are thus made effective for the transfer of fluid from the former to the latter. On the other hand whenever the circuit is closed by passage of electric current to the coil 141 the resulting magnetic field depresses the coil 142 to cause the valve 152 to cut off communication between ports 23 and 28 and simultaneously to establish communication between ports 28 and 36 thus inter-connecting the pipes 26 and 39 and causing the hydraulic fluid previously disposed within the cylinder 19 to be discharged to reservoir 38. Such discharge causes the piston of said cylinder and the linkage connected therewith, to move to the left a sufficient distance to cause an opening of the door controlled thereby. Upon interruption of current flow to coil 141 the valve returns to its original setting, thus re-establishing pressure flow from pipes 25 to cylinder 19 by way of valve ports 23 and 28 and pipe 26.

The method of extending the hydraulic and electrical connections from the single door operating unit to a complete set of door operating units 19, 19A, 19B and 19C is illustrated diagrammatically in Fig. 1 the diagram also indicating more completely the electrical and hydraulic connections controlling operation of the complete set of brake actuating units representing the complete equipment for the vehicle upon which the system is installed. Each of the door operating units has associated therewith one of the valve units of the series indicated at 16, 16A, 16B and 16C each of which corresponds in its structure and mode of operation to the unit 16 illustrated in detail in Figs. 7, 8 and 9, the controlling solenoids for the respective units being indicated diagrammatically in Fig. 1 at 141, 141A, 141B and 141C, all of which solenoids are shown as adapted to receive energizing current from a suitable source 176 located on the vehicle, the respective solenoid circuits 186 to 189 inclusive being individually operable by the manually controlled switches 180 to 183 inclusive located in a control fixture 184 disposed in a position of accessibility to the operator of the vehicle. This energy source 176 also serves to supply energizing current to the solenoid 111 of the valve 17, the flow of current being under the control of the hydraulic switch 175. The valve 17, as previously indicated, controls the flow of operating fluid to the shuttle valve 34, and thus renders the valve 34 capable of responding to pressure applied thereto by reason of any shift in the position of piston 194 of the master cylinder 193, the said piston 194 and its rod 195 being manually connected to the operator's brake pedal 196, whereby shifting of the pedal 196 creates a corresponding shift of the piston 194 to produce a pressure in the shuttle valve 34 which the latter communicates to the wheel brake cylinders 20 in conventional manner by way of the intervening connections between the units 20—34 as illustrated.

The maximum pressure applicable to the control valve 17 is regulated by the pressure regulating valve 201 which operates to essentially by-pass direct to the return line 30 the fluid entering the unit 201 after the pressure therein has reached the predetermined maximum value; the by-pass connection being indicated at 202.

As the vehicle approaches a stop, the operator applies pressure to his brake pedal 196, thereby moving piston 194 to the left in master brake cylinder 193. The pressure thus applied to the hydraulic fluid in the double check valve 34 causes its central shuttle element 219 to shift all the way to the left, thus allowing the hydraulic pressure to be applied to the wheel brake cylinders 20, by way of the conduit leading out of the central port of valve 34. The vehicle thereupon comes to rest, whereupon the operator depresses switches 180 to 183, or some selected one or more of said group of switches, but in any event the switch 180, at least, will be operated. Current thereupon flows from source 176 to solenoid winding 141 of valve 16, to cause valve plunger 142, and ball valves 52 to move down closing off communication between pressure supply line 25 and the valve, and at the same time establishing communication between valve ports 28 and 36. This communication between ports 28 and 36 permits the fluid in the right-hand end (Fig. 14) of door motor 19 to be discharged to the sump 38, and also causes the discharge to sump 38 of the fluid below the piston 210 of switch cylinder 211, the discharge taking place by way of conduit 212, valve 16, and conduits 213 and 39.

The above-described discharge of fluid from the right side (Fig. 1) of motor 19, with fluid pressure still applied to the left of the piston element 61 of said motor (by way of conduit 221 leading to port 35), causes the piston rod 59 to move to the right, as viewed in Fig. 1, which is to the left as viewed in Fig. 2. This motion of rod 59 causes the door (not shown) to open. Simultaneously, the discharge of fluid from the lower end of switch cylinder 211 allows spring 216 of said cylinder to expand, depressing the piston 210 sufficiently to cause switch plate 175 to bridge the contacts adjacent thereto. This switch action establishes a circuit from source 176 to solenoid winding 111 of valve 17.

The resultant energization of solenoid 111 causes pressure fluid to flow between ports 24 and 29 of valve 17 (see Fig. 6) whereupon the conduit 27 becomes effective to deliver pressure fluid to the left side of the central element 219, shifting the latter back to its right-hand limit of motion; and causing fluid pressure to be applied continuously to the wheel brake cylinders 20, (independently of any pressure on pedal 196) so long as the switch 175 remains closed. Said switch 175, it will be noted, was closed as an automatic result of the closing of door-opening switch 180, and will remain closed until said switch 180 is re-opened. When such re-opening occurs, coil 141 de-energizes, valve element 142 shifts back upwardly (Figs. 9 and 10), and fluid pressure is again applied, both to cylinder 211 and the right side of door motor 19. The re-application of pressure to cylinder 211 causes the switch 175 to re-open and the re-application of pressure to the right side of door motor 19 causes the rod 59 to return the door to the closed position. Re-opening of switch 175 de-energizes the coil 111 of valve 117 permitting a discharge of pressure from the conduit 27 thereby relaxing the pressure on the wheel brake cylinders 20 so that the operator is now free to set the vehicle in motion again, the doors having been safely closed. During the ensuing travel of the vehicle the wheel brake cylinder 20 will be under the conventional control by way of the master cylinder 193 which is in turn responsive to the brake pedal 196.

Figs. 10, 11 and 12 illustrate a pressure responsive and manually adjustable valve combination which, if desired, may be inserted in the lines 26 and 221 to provide means for separately adjusting the rate of fluid flow in each line, in each direction of flow, and thus separately control the speed of piston travel in each direction. As illustrated in these three figures such a valve combination includes a needle valve 416 and a ball valve 417, mounted in a common housing 411 having entrance and exit ports 414, 415 permitting flow in two directions alternately; the ports being in communication, one with the other, by way of the passages 412 and 413. Flow from passage 412 to passage 413 is possible only to the extent of the opening left between the apex of the needle valve 416 and the arm of the passage 413; this opening being variable by the turning of the valve stem to shift it axially of the tapped hole into which it is threaded. Flow in the reverse direction, on the other hand, is virtually unrestricted, as the ball 117 is freely liftable from its seat by the pressure of such reverse flow.

What we claim is:

1. In combination, a fluid pressure source, a fluid pressure-powered door operating mechanism effective, when fluid pressure is operatively applied thereto, to cause said door to close, and when fluid pressure is operatively removed therefrom, to cause said door to open, fluid pressure-transmitting connections between said source and said door operating mechanism including a door control valve, said valve having a pressure inlet communicating with said pressure source and a pressure outlet communicating with said door operating mechanism and selectively connectable to said pressure inlet or to exhaust depending upon whether said valve is in first or second operative positions, a fluid pressure-actuated brake mechanism, an operative fluid connection between said brake mechanism and a source of fluid pressure including an electrically actuated brake valve which, when electrically energized, causes said brake mechanism to be actuated, a source of electrical energy operatively connected to said brake valve via a normally closed fluid pressure-controlled switch, and an operative fluid pressure-transmitting connection between said switch and the fluid outlet of said door control valve, the application of suitable fluid pressure to said switch causing said switch to open, said door control valve, when in its first operative position, causing said door to close and said switch to open, and when in its second operative position, causing said door to open and said switch to close, thereby actuating said brake mechanism.

2. In combination, a pressure source, a differential-pressure-powered door operating mechanism effective, when pressure is applied only to one side thereof, to cause said door to open, and when pressure is applied to said one and to the other side thereof, to cause said door to close, pressure-transmitting connections between said source and said sides and including a door control valve between said source and said other side, said door control valve having a pressure inlet from said source, a pressure outlet to said other side, and an exhaust outlet, said valve being placeable in a first operative position in which said inlet and said outlet are connected and a second operative position in which said outlet and said exhaust are connected, a pressure-actuated brake mechanism, an operative connection between said brake mechanism and a source of pressure including an electrically actuated valve which, when electrically energized, causes said brake mechanism to be actuated, a source of electrical energy operatively connected to said brake valve via a normally closed pressure-controlled switch, and an operative pressure-transmitting connection between said switch and the outlet of said door control valve, said door control valve, when in its first operative position, causing said door to close and said switch to open, and when in its second operative position, causing said door to open and said switch to close, thereby actuating said brake mechanism.

3. The combination of claim 2, in which the same pressure source is connected to said door operating mechanism and said brake actuating mechanism, a pressure reducing instrumentality being interposed in advance of said brake actuating mechanism and out of operative relationship to said door operating mechanism, whereby a lesser pressure is applied to said brake actuating mechanism than to said door operating mechanism.

References Cited in the file of this patent

UNITED STATES PATENTS

| | | |
|---|---|---|
| 1,390,602 | Cass | Sept. 13, 1921 |
| 1,414,073 | Dewson | Apr. 25, 1922 |
| 1,805,983 | Hockley | May 19, 1931 |
| 1,901,918 | McCune | Mar. 21, 1933 |
| 1,943,819 | Forman | Jan. 16, 1934 |
| 1,971,048 | Parsons | Aug. 21, 1934 |
| 2,115,845 | Forman | May 3, 1938 |
| 2,226,671 | Sanford | Dec. 31, 1940 |
| 2,228,594 | Eaton | Jan. 14, 1941 |
| 2,311,806 | Almond | Feb. 23, 1943 |
| 2,502,118 | Ashton et al. | Mar. 28, 1950 |
| 2,561,922 | Hall | July 24, 1951 |